(12) United States Patent
Araki et al.

(10) Patent No.: US 7,545,608 B2
(45) Date of Patent: Jun. 9, 2009

(54) CURRENT-PERPENDICULAR-TO-THE-PLANE (CPP) MAGNETORESISTIVE SENSOR WITH IMPEDANCE ADJUSTMENT

(75) Inventors: Satoru Araki, San Jose, CA (US); John Contreras, Palo Alto, CA (US); Klaas Berend Klaassen, San Jose, CA (US); Ramona Marie Patterson, San Jose, CA (US); David John Seagle, Morgan Hill, CA (US); Howard Gordon Zolla, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 365 days.

(21) Appl. No.: 11/554,469

(22) Filed: Oct. 30, 2006

(65) Prior Publication Data

US 2008/0100970 A1 May 1, 2008

(51) Int. Cl.
*G11B 5/39* (2006.01)
(52) U.S. Cl. ...................... 360/319; 360/323
(58) Field of Classification Search ............... 360/319, 360/323
See application file for complete search history.

(56) References Cited

U.S. PATENT DOCUMENTS

| | | | |
|---|---|---|---|
| 5,539,598 A * | 7/1996 | Denison et al. ............. 360/323 |
| 6,046,890 A | 4/2000 | Yamada et al. |
| 6,081,409 A * | 6/2000 | Hughbanks et al. ......... 360/128 |
| 6,160,688 A | 12/2000 | Okumura |
| 6,344,952 B1 * | 2/2002 | Biskeborn et al. ........... 360/319 |
| 6,400,534 B1 | 6/2002 | Klaassen |
| 6,859,347 B2 | 2/2005 | Hsiao et al. |
| 7,392,579 B2 * | 7/2008 | Leung et al. ............. 29/603.16 |
| 2002/0085318 A1 * | 7/2002 | Hsiao et al. ................. 360/323 |
| 2004/0057146 A1 * | 3/2004 | Lee et al. ..................... 360/46 |
| 2004/0090715 A1 * | 5/2004 | Hsiao et al. ................. 360/323 |
| 2004/0264034 A1 | 12/2004 | Watanabe et al. |
| 2005/0219765 A1 | 10/2005 | Kiyono et al. |

(Continued)

OTHER PUBLICATIONS

Waits, "High-Resistivity Thin-Film Resistors for Monolithic Circuits—A Review", Solid State Technology, Jun. 1969, pp. 64-68.

(Continued)

*Primary Examiner*—Jefferson Evans
(74) *Attorney, Agent, or Firm*—Thomas R. Berthold (57) ABSTRACT

A current-perpendicular-to-the-plane (CPP) magnetoresistive (MR) read head structure has the MR read head located between first and second shields (S1, S2) on a substrate with a shunt resistor R1 connecting S1 to the substrate and a shunt resistor R2 connecting S2 to the substrate, with R1 and R2 being approximately equal. Because R1 and R2 are close enough in value there is no significant interference pickup in the low frequency region. The shunt resistors can be formed from high-resistivity metal nitrides or cermets. The spacing between the substrate and S1 may be selected to make the capacitance between S1 and the substrate approximately equal to the capacitance between S2 and the substrate to substantially reduce interference pickup in the high frequency region. Equalization conductors (EC1, EC2) may be connected to the substrate and spaced from S2 and S1, respectively, by electrically insulating material to create additional capacitances with values selected to substantially equalize the total parasitic capacitance on S2 with the total parasitic capacitance on S1.

16 Claims, 5 Drawing Sheets

U.S. PATENT DOCUMENTS

2006/0082929 A1* 4/2006 Kiyono et al. .............. 360/317
2006/0256481 A1* 11/2006 Kagami et al. .............. 360/317
2007/0076328 A1* 4/2007 Jayasekara et al. .......... 360/323
2007/0091512 A1* 4/2007 Nichols et al. ........... 360/324.2
2007/0133131 A1* 6/2007 Biskeborn .................. 360/323
2007/0211373 A1* 9/2007 Lee et al. ...................... 360/81

OTHER PUBLICATIONS

Gasperic et al., "Some Electrical Properties of Thin Cermet Films", Thin Solid Films, 36 (1976) 353-356.

* cited by examiner

CURRENT-PERPENDICULAR-TO-THE-PLANE (CPP) MAGNETORESISTIVE SENSOR WITH IMPEDANCE ADJUSTMENT

BACKGROUND OF THE INVENTION

1. Field of the Invention

The invention relates generally to a current-perpendicular-to-the-plane (CPP) magnetoresistive sensor that operates with the sense current directed perpendicularly to the planes of the layers making up the sensor stack, and more particularly to a CPP sensor with impedance adjustment for reduction of electrical interference.

2. Background of the Invention

One type of conventional magnetoresistive sensor used as the read head in magnetic recording disk drives is a "spin-valve" (SV) sensor. A SV magnetoresistive (MR) sensor has a stack of layers that includes two ferromagnetic layers separated by a nonmagnetic electrically conductive spacer layer, which is typically copper (Cu). One ferromagnetic layer has its magnetization direction fixed, such as by being pinned by exchange coupling with an adjacent antiferromagnetic layer, and the other ferromagnetic layer has its magnetization direction "free" to rotate in the presence of an external magnetic field. With a sense current applied to the sensor, the rotation of the free-layer magnetization relative to the fixed-layer magnetization is detectable as a change in electrical resistance.

In a magnetic recording disk drive SV read sensor or head, the magnetization of the fixed or pinned layer is generally perpendicular to the plane of the disk, and the magnetization of the free layer is generally parallel to the plane of the disk in the absence of an external magnetic field. When exposed to an external magnetic field from the recorded data on the disk, the free-layer magnetization will rotate, causing a change in electrical resistance. If the sense current flowing through the SV is directed parallel to the planes of the layers in the sensor stack, the sensor is referred to as a current-in-the-plane (CIP) sensor, while if the sense current is directed perpendicular to the planes of the layers in the sensor stack, it is referred to as current-perpendicular-to-the-plane (CPP) sensor. CPP-SV read heads are described by A. Tanaka et al., "Spin-valve heads in the current-perpendicular-to-plane mode for ultra-high-density recording", *IEEE TRANSACTIONS ON MAGNETICS*, 38 (1): 84-88 Part 1 JANUARY, 2002. Another type of CPP sensor is a magnetic tunnel junction (MTJ) sensor in which the nonmagnetic spacer layer is a very thin nonmagnetic tunnel barrier layer. In a MTJ sensor the tunneling current perpendicularly through the layers depends on the relative orientation of the magnetizations in the two ferromagnetic layers. While in a MTJ MR read head, also called a tunneling MR (TMR) read head, the spacer layer is formed of an electrically insulating material, such as $TiO_2$, MgO or $Al_2O_3$, in a CPP-SV MR read head the spacer layer is formed of an electrically conductive material such as Cu.

In a magnetic recording disk drive the CPP read head structure is connected to the differential pre-amplifier by two conductors that form an interconnect pair. If the parasitic capacitance is unevenly distributed in the interconnect pair, common-mode electrical interference is transferred into a differential-mode interference that adds to the read data signal. However, if the parasitic capacitance is balanced between the interconnect pair, then the common-mode electrical interference remains common-mode which can be rejected by the differential pre-amplifier.

What is needed is a CPP read head structure with balanced parasitic capacitance.

SUMMARY OF THE INVENTION

The invention is a CPP MR read head structure with balanced parasitic capacitance. The MR read head is located between first and second shields (S1, S2) on a substrate with a shunt resistor R1 connecting S1 to the substrate and a shunt resistor R2 connecting S2 to the substrate, with R1 and R2 being approximately equal. The capacitance between S1 and the substrate can be represented by C1 and the capacitance between S2 and the substrate can represented by C2. Because R1 and R2 are close enough in value there is no significant interference pickup in the low frequency region. The shunt resistors can be formed from high-resistivity metal nitrides or cermets (composites of ceramic and metallic materials), such as cermets, which are multiphase materials composed of a metal and an immiscible oxide (e.g., Pt—SiO and Cr—SiO), and metal nitrides such as TaN.

In one implementation of the structure the spacing between the substrate and S1 is selected to achieve C1 being approximately equal to C2 to substantially reduce interference pickup in the high frequency region.

In another implementation of the structure a first equalization conductor EC1 is connected to the substrate and spaced from S2 by electrically insulating material with the capacitance between EC1 and S2 being represented by C4. The value of C4 is selected to substantially equalize the total parasitic capacitance on S2 with the total parasitic capacitance on S1. A second equalization conductor EC2 may be connected to the substrate and spaced from S1 by electrically insulating material with the capacitance between EC2 and S1 being represented by C5, in which case the values of both C4 and C5 are selected to substantially equalize the total parasitic capacitance on S2 with the total parasitic capacitance on S1.

For a fuller understanding of the nature and advantages of the present invention, reference should be made to the following detailed description taken together with the accompanying figures.

DETAILED DESCRIPTION OF THE INVENTION

Figure 1:
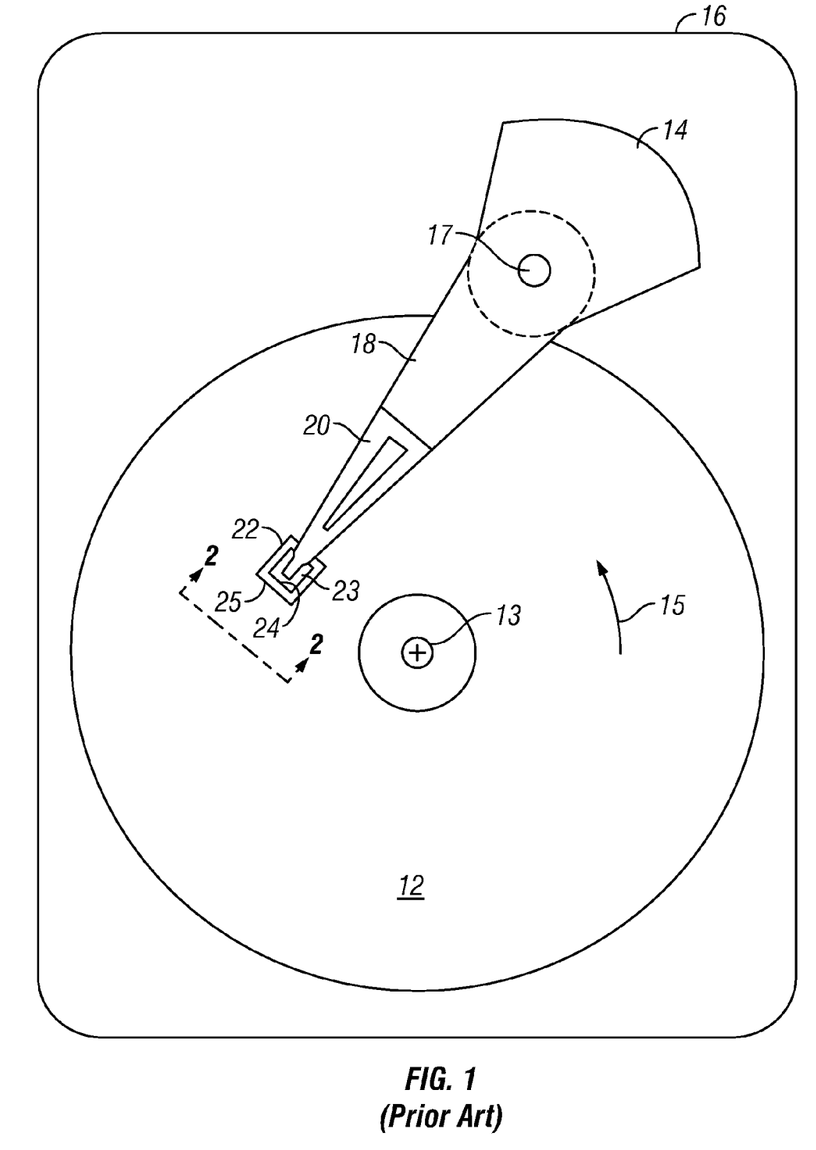
FIG. 1 is a schematic top view of a conventional magnetic recording hard disk drive with the cover removed.

The CPP sensor of this invention has application for use as a magnetoresistive read head in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
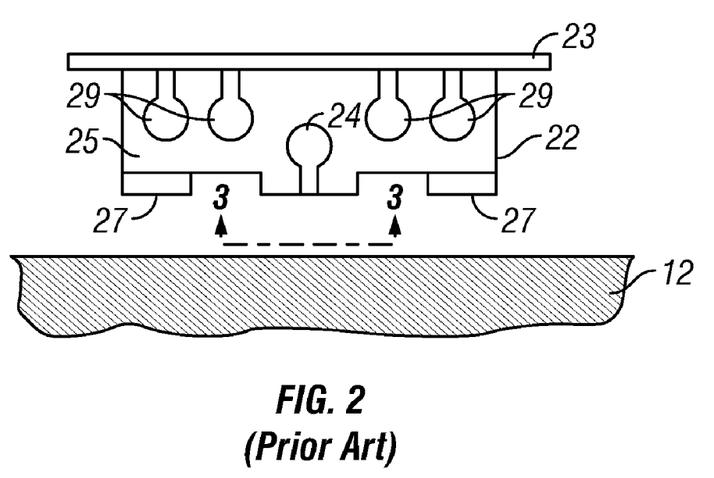
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25.

Figure 3:
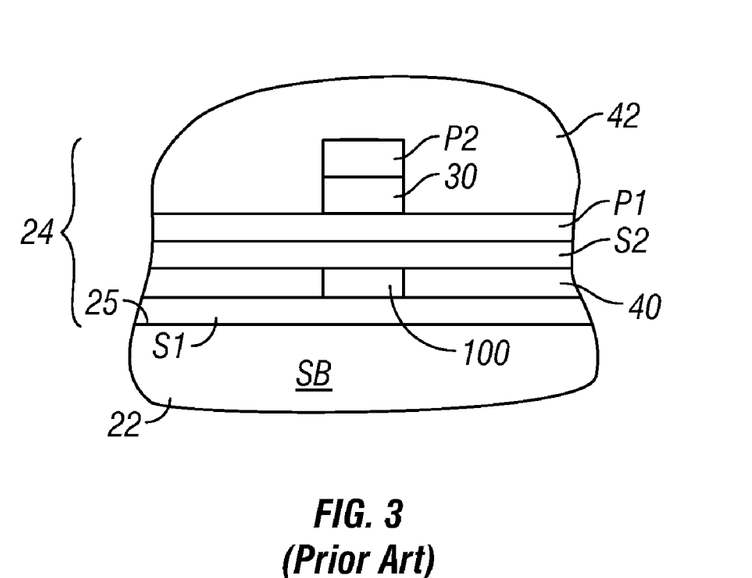
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The slider body (SB) is typically a ceramic material, such as an alumina/titanium-carbide ($Al_2O_3$/TiC) composite. The write head includes magnetic write poles P2 and P1 separated by a write gap 30. The CPP-SV magnetoresistive sensor or read head 100 is located between two magnetic shields S1 and S2. The shields S1, S2 are formed of magnetically permeable material, typically electroplated NiFe alloy films, and are electrically conductive so they can function as the electrical leads to the read head 100. Separate electrical leads may also be used, in which case the read head 100 is formed in contact with layers of electrically conducting lead material, such as tantalum, gold, or copper, that are in contact with the shields S1, S2. The read head 100 comprises a stack of layers formed between the two magnetic shield layers S1, S2. The lower shield S1 is typically polished by chemical-mechanical polishing (CMP) to provide a smooth substrate for the growth of the stack of layers. The structure of the layers in read head 100 is well-known and typically includes a reference ferromagnetic layer with a fixed magnetic moment or magnetization direction oriented transversely (into the page), a free ferromagnetic layer having a magnetic moment or magnetization direction that can rotate in the plane of layer in response to transverse external magnetic fields from the disk 12, and a spacer layer between the reference and free layers. In a CPP-SV read head the spacer is electrically conductive, while in an MTJ type of CPP read head the spacer layer is electrically insulating. The material generally surrounding the read/write head 24, such as in the region 40 between shields S1, S2 and in the region 42 surrounding P2 and write gap 30, is insulating material, typically alumina.

Figure 4:
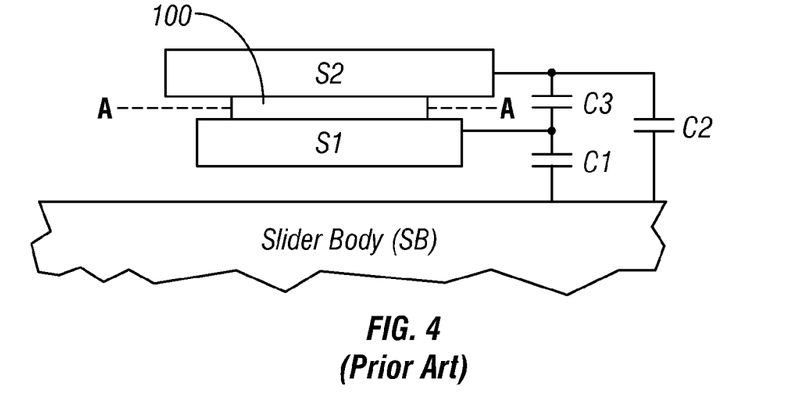
FIG. 4 is a schematic of a typical CPP read head structure with read head 100 and shields S1, S2 for illustrating the parasitic capacitance elements.

FIG. 4 is a schematic of a typical CPP read head structure with read head 100 and shields S1, S2 for illustrating the parasitic capacitance elements. As an inherent result of the manufacturing process the structure has an inherent asymmetry with respect to reference line A-A. This asymmetry creates unequal capacitance values from SB to S1 and from SB to S2. In a CPP read head, unequally distributed capacitance in the interconnect system causes common-mode electrical interference to be transferred into a differential-mode interference that adds to the read data signal and is impossible to reject using a differential pre-amplifier in the disk drive's read/write integrated circuit (IC). However, if the capacitance is balanced, then common-mode electrical interference remains as a common-mode interference which is easily rejected by the differential pre-amplifier.

The total capacitance for the shields is described by the following equations:

$$\text{Shield 1 total capacitance}(C1T): \ C1T = C1 + \frac{C2C3}{C2+C3} \quad \text{(Equation 1)}$$

$$\text{Shield 2 total capacitance}(C2T): \ C2T = C2 + \frac{C1C3}{C1+C3} \quad \text{(Equation 2)}$$

In addition to the parasitic capacitive elements, there may be resistive elements connecting each shield to the slider body (SB). Therefore, there are two frequency regions for the interference coupling in the structure: a low-frequency (LF) region, and a high-frequency (HF) region.

Figure 5:
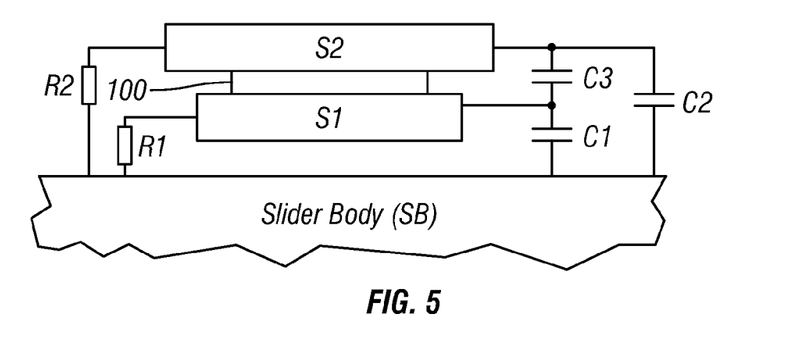
FIG. 5 is a schematic of the impedance-adjusted CPP read head of this invention showing shunt resistors R1, R2 connected to shields S1, S2 for equalizing the impedance levels in the low frequency (LF) region.

In the impedance-adjusted CPP read head of this invention the interference is reduced by equalizing the impedance levels in the LF and HF frequency regions. For the LF region, shunt resistors R1, R2 connecting to shields S1, S2, respectively, are used. FIG. 5 is a schematic showing the shunt resistor connections. The resistance values, R1 and R2, are made to be approximately equal, with typical values for R1 and R2 being between about 10 to 100 kΩ. The electrical resistances of R1 and R2 are close enough in value that there is no significant interference pickup in the LF region.

Figure 6:
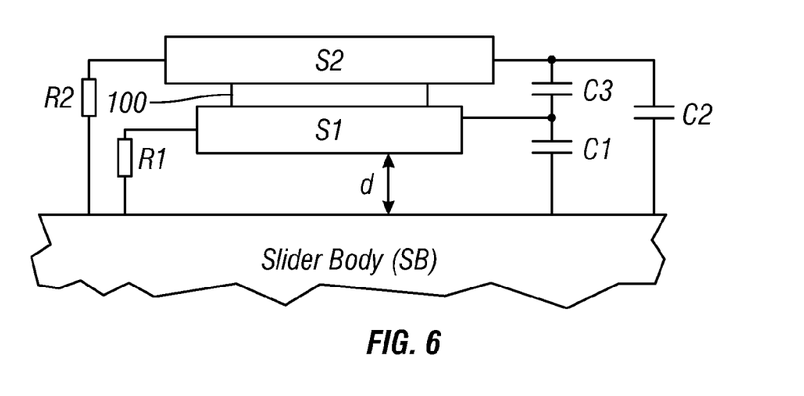
FIG. 6 is a schematic of the impedance-adjusted CPP read head of this invention with low and high frequency equalization created by resistors R1, R2 and an increase in distance d to reduce C1.
Figure 7:
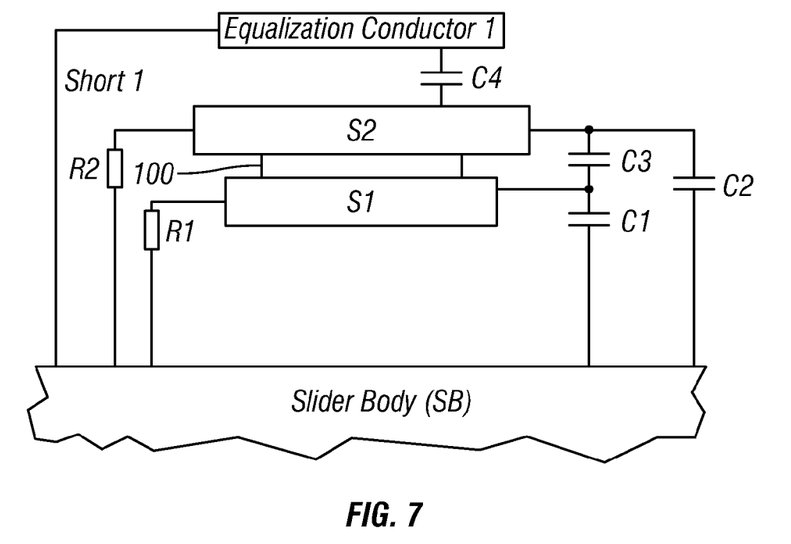
FIG. 7 is a schematic of the impedance-adjusted CPP read head of this invention with low and high frequency equalization created by resistors R1 and R2 and the addition of an equalization conductor to add capacitance C4.
Figure 8:
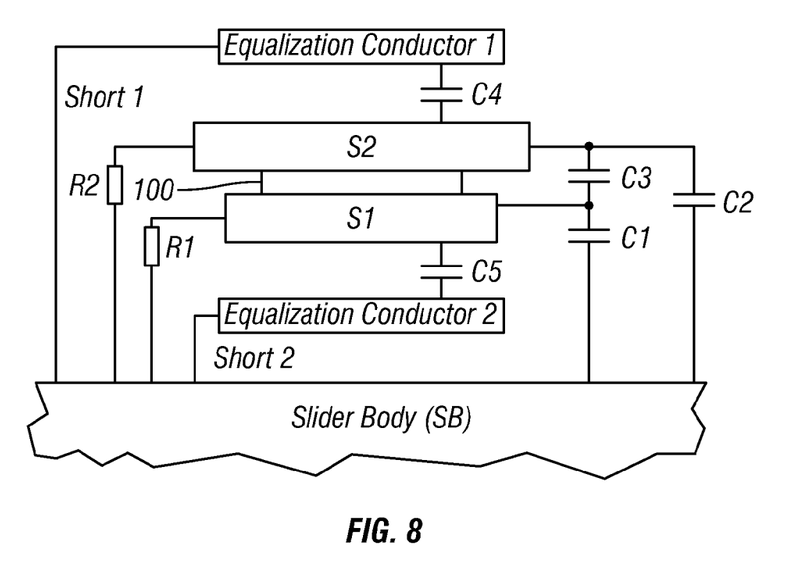
FIG. 8 is a schematic of the impedance-adjusted CPP read head of this invention with low and high frequency equalization created by resistors R1 and R2 and the addition of equalization conductors to add capacitances C4 and C5.

For HF equalization, the impedance-adjusted CPP read head reduces the interference by minimizing and equalizing the parasitic capacitance. There are three approaches to this:

1) Reduce parasitic capacitance C1 as much as possible, as illustrated by FIG. 6;
2) Introduce or utilize conductive structures near or attached to S2 to increase and/or equalize parasitic capacitances C1T and C2T, as illustrated by FIG. 7; and
3) Introduce or utilize conductive structures near S1 and S2 to increase and/or equalize parasitic capacitances C1T and C2T, as illustrated by FIG. 8.

The capacitance between two conductors is determined by the following equation:

$$C = \frac{A\varepsilon}{d} \quad \text{(Equation 3)}$$

where A=cross-sectional area between two conductors,
d=distance between the two conductors, and ε=permittivity of the material between the two conductors.

From Equation 3, increasing the distance d in FIG. 6 makes capacitances C1 and C2 approximately equal, which results in C1T and C2T (Equations 1 and 2) becoming substantially equivalent. The capacitances C1 and C2 are close enough in value that there is no significant interference pickup in the HF region.

In FIG. 7, an equalization conductor 1 (EC1) near shield S2 modifies the total capacitance for each shield by adding a capacitance C4. EC1 can be added, for example by patterning a layer of copper or other electrically conductive material of the appropriate cross-sectional area and thickness on the structure. The function of EC1 can also be performed by a neighboring conductor, such as a conductor used for the write head. With the addition of capacitance C4, Equations 1 and 2 are changed to the following expressions:

$$\text{Shield 1 total capacitance: } C1T = C1 + \frac{(C2+C4)C3}{C2+C3+C4} \quad \text{(Equation 4)}$$

$$\text{Shield 2 total capacitance: } C2T = C2 + C4 + \frac{C1C3}{C1+C3} \quad \text{(Equation 5)}$$

With the specific capacitive elements (C1, C2, and C3), capacitance C4 can be adjusted to make the capacitances C1T and C2T substantially equivalent.

In FIG. 8, an equalization conductor 2 (EC2) near shield S1 modifies the total capacitance for each shield by adding a capacitance C5 in conjunction with capacitance C4 added by EC1. With the addition of capacitance C5, Equations 4 and 5 are the changed to the following expressions:

$$\text{Shield 1 total capacitance: } C1T = C1 + C5 + \frac{(C2+C4)C3}{C2+C3+C4} \quad \text{(Equation 6)}$$

$$\text{Shield 2 total capacitance: } C2T = C2 + C4 + \frac{(C1+C5)C3}{C1+C3+C5} \quad \text{(Equation 7)}$$

With the specific capacitive elements (C1, C2, C3, and C4), capacitance C5 can be adjusted to make the capacitances C1T and C2T substantially equivalent.

In the fabrication of the impedance-adjusted CPP read head the shunt resistors R1, R2 are required to have a resistance between about 10 to 100 kΩ. However R1 and R2 must be physically small or they will contribute their own parasitic capacitance. Thus R1 and R2 must be fabricated from materials with high resistivity.

In this invention the shunt resistors are formed from high-resistivity metal nitrides or cermets (composites of ceramic and metallic materials). Examples of metal nitrides include TaN or any metal nitride which can be synthesized over a large resistivity range. Examples of cermets include composites of metals such as Cr, Pt, Ta, Ni, Mo, Pt, Au and Ag with immiscible oxides such as oxides of silicon, aluminum, tantalum and chromium (e.g., SiO, $SiO_2$, $Al_2O_3$, $Ta_2O_5$ and CrOx) to yield multiphase high-resistivity films. Silicon-containing cermets like Cr—SiO (e.g., $Cr_{60}$—$SiO_{40}$) are of special interest. A resistivity from about 200 to about 10,000 micro-Ω-cm can be readily achieved in these classes of materials. A resistivity of this magnitude permits relatively thick films (e.g., 30 to 100 nm) to be fabricated for the shunt resistors. Because the resistance of a thin film of a fixed surface area is inversely proportional to the film thickness, these high-resistivity materials allow the films to be made substantially thicker, thereby avoiding the need to make very thin films to achieve the high resistance. The ability to use thicker films makes the resistance easier to control and makes the films more tolerant of surface treatment processes that may be required to make ohmic contacts with the films. Cermet and metal nitride films can be readily deposited by techniques such as sputtering, reactive sputtering, ion beam sputtering, reactive ion beam sputtering, plasma vapor deposition (PVD), evaporation, and chemical vapor deposition (CVD). The films can be deposited and subsequently oxidized or nitrided. Such chemical treatment can be conducted with reactive ions, chemical solutions, ion implantation, ozone, steam or other known techniques. Patterning of the films to obtain the desired area for the shunt resistors can be done using subtractive techniques such as lift off, ion milling, reactive ion etching (RIE) or chemical etching.

Figure 9:
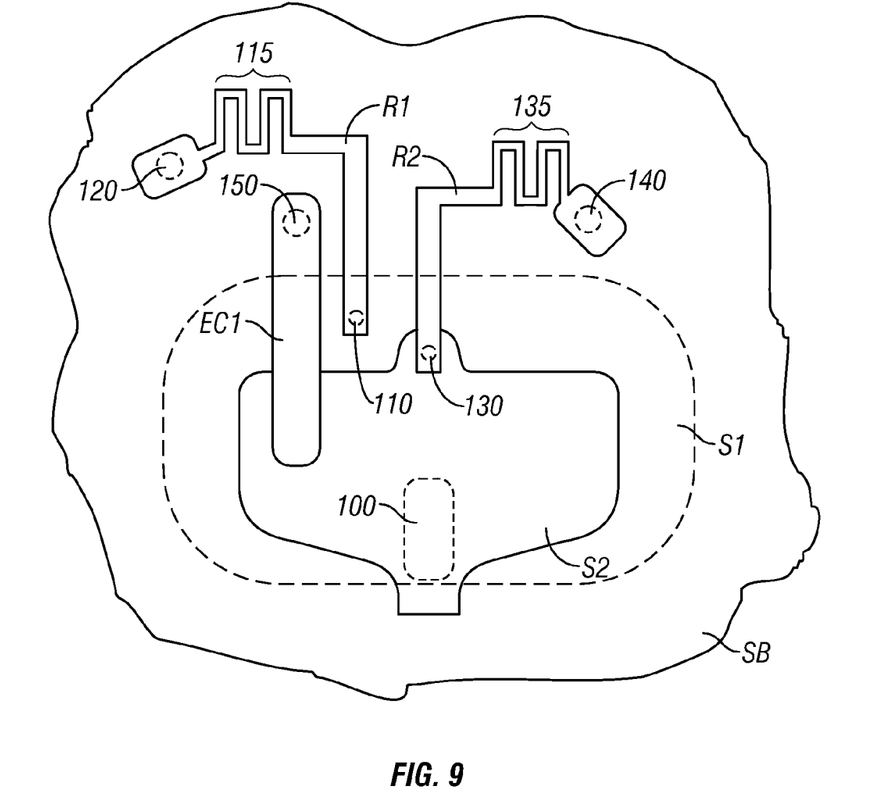
FIG. 9 is a top view of a wafer onto which the impedance-adjusted CPP read head of this invention is fabricated and illustrates how the shunt resistors and equalization conductors may be fabricated.

FIG. 9 is a top view of a wafer onto which the impedance-adjusted CPP read head of this invention is fabricated and illustrates how the shunt resistors and equalization conductors may be fabricated. FIG. 9 is an example of the embodiment depicted schematically in FIG. 7 with resistors R1, R2 and equalization conductor EC1. The substrate is the slider body (SB). Shield S1 is patterned on electrically insulating material, typically alumina, that is deposited on SB. Shield S2, having a different shape and thus different area than S1, is patterned above S1 with the read head 100 between S1 and S2. Additional alumina is formed on top of S2. Vias 110 and 120 for R1, vias 130 and 140 for R2, and via 150 for EC1 are formed through this additional alumina. Via 110 connects down to S1 and via 120 connects down to SB. Via 130 connects down to S2 and via 140 connects down to SB. Via 150 connects down to SB. Shunt resistor R1 is patterned on top of this additional alumina and connected to the two vias 110, 120. R1 is patterned to have a line width and total length to produce the desired value of R1, based on the known film thickness and resistivity of the deposited material. The length of R1 can be adjusted by increasing or decreasing the extent of the serpentine portion 115 of the line pattern. This provides the R1 shunt resistor between S1 and SB, as depicted schematically in FIG. 7. Shunt resistor R2 is patterned on top of this additional alumina and connected to the two vias 130, 140. R2 is patterned to have a line width and total length to produce the desired value of R2, based on the known film thickness and resistivity of the deposited material. The length of R2 can be adjusted by increasing or decreasing the extent of the serpentine portion 135 of the line pattern. This provides the R2 shunt resistor between S2 and SB, as depicted schematically in FIG. 7. The equalization conductor EC1, typically copper, is also patterned on this additional alumina and connected to another via 150 that is also formed down to SB. This provides EC1, as depicted schematically in FIG. 7. The area of EC1 can be adjusted to generate the desired capacitance value C4, given the known area of S2 and the thickness of the additional alumina layer between S2 and EC1.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A current-perpendicular-to-the-plane read head structure comprising:
   a substrate;

a first shield S1 of magnetically permeable material on the substrate, wherein the capacitance between S1 and the substrate is represented by C1;

a second shield S2 of magnetically permeable material, the first shield being located between the substrate and the second shield, wherein the capacitance between S2 and the substrate is represented by C2;

a magnetoresistive read head between and in contact with the first and second shields;

a first shunt resistor connecting the first shield to the substrate; and a second shunt resistor connecting the second shield to the substrate;

wherein the electrical resistances of the first and second shunt resistors are approximately equal and wherein the spacing between the substrate and S1 is selected to achieve C1 being approximately equal to C2.

2. The structure of claim 1 further comprising a first equalization conductor EC1 electrically connected to the substrate and spaced from S2 by electrically insulating material, the capacitance between EC1 and S2 being represented by C4, wherein C4 has a value to substantially equalize the total parasitic capacitance on S2 with the total parasitic capacitance on S1.

3. The structure of claim 2 further comprising a second equalization conductor EC2 electrically connected to the substrate and spaced from S1 by electrically insulating material, the capacitance between EC2 and S1 being represented by C5, wherein C4 and C5 have values to substantially equalize the total parasitic capacitance on S2 with the total parasitic capacitance on S1.

4. The structure of claim 1 wherein the shunt resistors are formed of a material selected from the group consisting of metal nitrides and a multiphase material comprising a metal and an immiscible oxide.

5. The structure of claim 4 wherein the shunt resistors are formed of a multiphase material comprising an immiscible silicon-oxide.

6. A current-perpendicular-to-the-plane read head structure comprising:

a substrate;

a first shield S1 of magnetically permeable material on the substrate;

a second shield S2 of magnetically permeable material, the first shield being located between the substrate and the second shield;

a magnetoresistive read head between and in contact with the first and second shields;

a first shunt resistor connecting S1 to the substrate;

a second shunt resistor connecting the S2 to the substrate, wherein the electrical resistances of the first and second shunt resistors are approximately equal; and a first equalization conductor EC1 electrically connected to the substrate and spaced from S2 by electrically insulating material, the capacitance between EC1 and S2 being represented by C4, wherein C4 has a value to substantially equalize the total parasitic capacitance on S2 with the total parasitic capacitance on S1.

7. The structure of claim 6 further comprising a second equalization conductor EC2 electrically connected to the substrate and spaced from S1 by electrically insulating material, the capacitance between EC2 and S1 being represented by C5, wherein C4 and C5 have values to substantially equalize the total parasitic capacitance on S2 with the total parasitic capacitance on S1.

8. The structure of claim 6 wherein the shunt resistors are formed of a material selected from the group consisting of metal nitrides and a multiphase material comprising a metal and an immiscible oxide.

9. The structure of claim 8 wherein the shunt resistors are formed of a multiphase material comprising an immiscible silicon-oxide.

10. A current-perpendicular-to-the-plane (CPP) read head structure comprising:

a substrate;

a first shield S1 of magnetically permeable material on the substrate;

a second shield S2 of magnetically permeable material, the first shield being located between the substrate and the second shield;

a magnetoresistive (MR) read head between and in contact with the first and second shields;

a first shunt resistor connecting the first shield to the substrate and formed of a material selected from the group consisting of metal nitrides and a multiphase material comprising a metal and an immiscible oxide; and a second shunt resistor connecting the second shield to the substrate and formed of a material selected from the group consisting of metal nitrides and a multiphase material comprising a metal and an immiscible oxide;

wherein the electrical resistances of the first and second shunt resistors are approximately equal.

11. The structure of claim 10 wherein the shunt resistors are formed of a multiphase material comprising an immiscible silicon-oxide.

12. The structure of claim 10 wherein the capacitance between S1 and the substrate is represented by C1 and the capacitance between S2 and the substrate is represented by C2, and wherein the spacing between the substrate and S1 is selected to achieve C1 being approximately equal to C2.

13. The structure of claim 10 further comprising a first equalization conductor EC1 electrically connected to the substrate and spaced from S2 by electrically insulating material, the capacitance between EC1 and S2 being represented by C4, wherein C4 has a value to substantially equalize the total parasitic capacitance on S2 with the total parasitic capacitance on S1.

14. The structure of claim 13 further comprising a second equalization conductor EC2 electrically connected to the substrate and spaced from S1 by electrically insulating material, the capacitance between EC2 and S1 being represented by C5, wherein C4 and C5 have values to substantially equalize the total parasitic capacitance on S2 with the total parasitic capacitance on S1.

15. The structure of claim 10 wherein the MR read head is a spin-valve read head.

16. The structure of claim 10 wherein the MR read head is a tunneling MR read head.

* * * * *